US012245019B2

(12) United States Patent
Honma et al.

(10) Patent No.: US 12,245,019 B2
(45) **Date of Patent: *Mar. 4, 2025**

(54) SIGNAL PROCESSING DEVICE, METHOD, AND PROGRAM

(71) Applicant: Sony Group Corporation, Tokyo (JP)

(72) Inventors: Hiroyuki Honma, Chiba (JP); Minoru Tsuji, Chiba (JP); Toru Chinen, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 264 days.

This patent is subject to a terminal disclaimer.

(21) Appl. No.: 18/088,002

(22) Filed: Dec. 23, 2022

(65) Prior Publication Data

US 2023/0126927 A1 Apr. 27, 2023

Related U.S. Application Data

(63) Continuation of application No. 17/400,010, filed on Aug. 11, 2021, now Pat. No. 11,805,383, which is a (Continued)

(30) Foreign Application Priority Data

Oct. 20, 2017 (JP) ................................ 2017-203877

(51) Int. Cl.
*H04S 7/00* (2006.01)
*G10K 15/12* (2006.01)
(Continued)

(52) U.S. Cl.
CPC .............. *H04S 7/305* (2013.01); *G10K 15/12* (2013.01); *H04S 3/008* (2013.01); *G10L 19/008* (2013.01);
(Continued)

(58) Field of Classification Search
CPC ........... G10K 15/12; H04S 7/30; H04S 7/305; H04S 3/008; H04S 5/02; H04S 7/00;
(Continued)

(56) References Cited

U.S. PATENT DOCUMENTS

| | | | |
|---|---|---|---|
| 5,742,688 | A | 4/1998 | Ogawa et al. |
| 11,109,179 | B2 | 8/2021 | Honma et al. |

(Continued)

FOREIGN PATENT DOCUMENTS

| | | |
|---|---|---|
| CN | 101014209 A | 8/2007 |
| CN | 101034548 A | 9/2007 |

(Continued)

OTHER PUBLICATIONS

Decision of Rejection for Chinese Application No. 201880066615.0 dated Mar. 29, 2024.

(Continued)

*Primary Examiner* — Paul Kim
(74) *Attorney, Agent, or Firm* — Wolf, Greenfield & Sacks, P.C.

(57) ABSTRACT

The present technology relates to a signal processing device, method, and program that can improve encoding efficiency. A signal processing device includes: an acquisition unit that acquires reverb information including at least one of space reverb information specific to a space around an audio object or object reverb information specific to the audio object and an audio object signal of the audio object; and a reverb processing unit that generates a signal of a reverb component of the audio object on the basis of the reverb information and the audio object signal. The present technology can be applied to a signal processing device.

14 Claims, 12 Drawing Sheets

Related U.S. Application Data continuation of application No. 16/755,771, filed as application No. PCT/JP2018/037330 on Oct. 5, 2018, now Pat. No. 11,109,179.

(51) Int. Cl.
*G10L 19/008* (2013.01)
*H04S 3/00* (2006.01)

(52) U.S. Cl.
CPC ....... *H04S 2400/01* (2013.01); *H04S 2400/11* (2013.01)

(58) Field of Classification Search
CPC .. H04S 2400/01; H04S 2400/11; G10L 19/00; G10L 19/008
USPC .......................................................... 381/303
See application file for complete search history.

(56) References Cited

U.S. PATENT DOCUMENTS

| | | | |
|---|---|---|---|
| 11,257,478 | B2 | 2/2022 | Tsuji et al. |
| 11,749,252 | B2 | 9/2023 | Tsuji et al. |
| 11,805,383 | B2 | 10/2023 | Honma et al. |
| 2005/0179701 | A1 | 8/2005 | Jahnke |
| 2006/0045283 | A1 | 3/2006 | Lin et al. |
| 2007/0140501 | A1 | 6/2007 | Schmidt et al. |
| 2012/0057715 | A1 | 3/2012 | Johnston et al. |
| 2012/0070005 | A1 | 3/2012 | Inou et al. |
| 2012/0082319 | A1 | 4/2012 | Jot et al. |
| 2013/0179575 | A1 | 7/2013 | Young et al. |
| 2015/0332663 | A1 | 11/2015 | Jot et al. |
| 2015/0373475 | A1 | 12/2015 | Raghuvanshi et al. |
| 2016/0125871 | A1 | 5/2016 | Shiraakihara |
| 2016/0198281 | A1* | 7/2016 | Oh ......................... H04S 3/002 381/310 |
| 2016/0219388 | A1 | 7/2016 | Oh et al. |
| 2016/0234620 | A1 | 8/2016 | Lee et al. |
| 2016/0249149 | A1 | 8/2016 | Oh et al. |
| 2018/0227692 | A1 | 8/2018 | Lee et al. |
| 2019/0253825 | A1 | 8/2019 | Tsuji et al. |
| 2020/0327879 | A1 | 10/2020 | Tsuji et al. |
| 2021/0195363 | A1 | 6/2021 | Honma et al. |
| 2021/0377691 | A1 | 12/2021 | Honma et al. |
| 2022/0148560 | A1 | 5/2022 | Tsuji et al. |
| 2023/0368772 | A1 | 11/2023 | Tsuji et al. |

FOREIGN PATENT DOCUMENTS

| | | | |
|---|---|---|---|
| CN | 103402169 | A | 11/2013 |
| CN | 103430574 | A | 12/2013 |
| CN | 105519139 | A | 4/2016 |
| CN | 105659630 | A | 6/2016 |
| CN | 105706467 | A | 6/2016 |
| CN | 105792090 | A | 7/2016 |
| EP | 0 036 337 | A2 | 9/1981 |
| EP | 0 480 561 | A3 | 9/1992 |
| EP | 2 840 811 | A1 | 2/2015 |
| EP | 3048814 | A1 | 7/2016 |
| EP | 3048815 | A1 | 7/2016 |
| EP | 3048816 | A1 | 7/2016 |
| EP | 3 096 539 | A1 | 11/2016 |
| EP | 3 209 002 | A1 | 8/2017 |
| EP | 3 407 573 | A1 | 11/2018 |
| FR | 2554615 | A1 | 5/1985 |
| JP | S61237600 | A | 10/1986 |
| JP | 2007-513370 | A | 5/2007 |
| JP | 2008-311718 | A | 12/2008 |
| JP | 2013541275 | A | 11/2013 |
| JP | 2016-534586 | A | 11/2016 |
| KR | 101627652 | B1 | 6/2016 |
| KR | 10-2016-0094348 | A | 8/2016 |
| KR | 20160108325 | A | 9/2016 |
| RU | 2403674 | C2 | 11/2010 |
| WO | WO 2005/055193 | A1 | 6/2005 |
| WO | WO 2011/008705 | A1 | 1/2011 |
| WO | WO 2012/033950 | A1 | 3/2012 |
| WO | 2015/107926 | A1 | 7/2015 |
| WO | WO 2015/152661 | A1 | 10/2015 |
| WO | 2017/043309 | A1 | 3/2017 |

OTHER PUBLICATIONS

Chen, The Foundation of Sound Production. China Light Industry Press, pp. 10-11, Aug. 2015.
Notification of the Second Office Action for Chinese Application No. 201880066615.0 dated Oct. 12, 2023.
Extended European Search Report dated Nov. 27, 2020 in connection with European Application No. 18868539.0.
Extended European Search Report dated Nov. 19, 2020 in connection with European Application No. 18869347.7.
International Search Report and English translation thereof mailed Dec. 18, 2018 in connection with International Application No. PCT/JP2018/037330.
International Search Report and English translation thereof mailed Dec. 18, 2018 in connection with International Application No. PCT/JP2018/037329.
International Written Opinion and English translation thereof mailed Dec. 18, 2018 in connection with International Application No. PCT/JP2018/037330.
International Written Opinion and English translation thereof mailed Dec. 18, 2018 in connection with International Application No. PCT/JP2018/037329.
International Preliminary Report on Patentability and English translation thereof mailed Apr. 30, 2020 in connection with International Application No. PCT/JP2018/037330.
International Preliminary Report on Patentability and English translation thereof mailed Apr. 30, 2020 in connection with International Application No. PCT/JP2018/037329.
[No Author Listed], International Standard ISO/IEC 23008-3. Information technology—High efficiency coding and media delivery in heterogeneous environments—Part 3: 3D audio. Feb. 1, 2016. 439 pages.
Coleman et al., Object-based reverberation for spatial audio. Journal of the Audio Engineering Society. Feb. 16, 2017;65(1/2):66-77.
Lee et al., An Object-based 3D Audio Broadcasting System for Interactive Service. Audio Engineering Society (AES) Convention Paper 6384. May 28-31, 2005, pp. 1-8, XP002577516. Retrieved from the Internet: URL:http://www.aes.org/tmpFiles/elib/20100 413/13100. pdf [retrieved on Apr. 12, 2010].
Pulkki, Virtual Sound Source Positioning Using Vector Base Amplitude Panning. J. Audio Eng. Soc. 1997;45(6):456-466.

* cited by examiner

FIG. 3

| Syntax | No. of bits | Mnemonic |
|---|---|---|
| object_metadata() | | |
| { | | |
| for ( i=0; i < num_objects; i++) { | | |
| position_azimuth[i]; | 8 | tcimsbf |
| position_elevation[i]; | 6 | tcimsbf |
| position_radius[i]; | 7 | uimsbf |
| if(flag_obj_reverb == 1){ | 1 | uimsbf |
| dry_gain[i] | 8 | uimsbf |
| wet_gain[i] | 8 | uimsbf |
| room_gain[i] | 8 | uimsbf |
| if(use_prev == 1){ | 1 | uimsbf |
| reverb_data_id[i] | 4 | uimsbf |
| }else{ | | |
| obj_reverb_data(i); | | |
| } | | |
| } | | |
| } | | |
| if(flag_room_reverb == 1){ | 1 | uimsbf |
| room_reverb_data(i); | | |
| } | | |
| } | | |

FIG. 4

| Syntax | No. of bits | Mnemonic |
|---|---|---|
| obj_reverb_data(obj_id) | | |
| { | | |
| reverb_data_id | 4 | uimsbf |
| num_out | 8 | uimsbf |
| len_ir | 8 | uimsbf |
| for ( i=0; i < num_out; i++) { | | |
| position_azimuth[i]; | 8 | tcimsbf |
| position_elevation[i]; | 6 | tcimsbf |
| position_radius[i]; | 7 | uimsbf |
| for ( j=0; j < len_ir; j++) { | | |
| impulse_response[i][j] | 16 | tcimsbf |
| } | | |
| } | | |
| } | | |
| room_reverb_data(obj_id) | | |
| { | | |
| num_out | 8 | uimsbf |
| len_ir | 8 | uimsbf |
| for ( i=0; i < num_out; i++) { | | |
| position_azimuth[i]; | 8 | tcimsbf |
| position_elevation[i]; | 6 | tcimsbf |
| position_radius[i]; | 7 | uimsbf |
| for ( j=0; j < len_ir; j++) { | | |
| impulse_response[i][j] | 16 | tcimsbf |
| } | | |
| } | | |
| } | | |

| | position | |
|---|---|---|
| | azimuth | elevation |
| REVERB COMPONENT 1 | +45 | 0 |
| REVERB COMPONENT 2 | −45 | 0 |
| REVERB COMPONENT 3 | +135 | 0 |
| REVERB COMPONENT 4 | −135 | 0 |

SIGNAL PROCESSING DEVICE, METHOD, AND PROGRAM

CROSS-REFERENCE TO RELATED APPLICATIONS

The present application claims the benefit under 35 U.S.C. § 120 as a continuation application of U.S. Application Ser. No. 17/400,010, filed on Aug. 11, 2021, which claims the benefit under 35 U.S.C. § 120 as a continuation application of U.S. Application Ser. No. 16/755,771, filed on Apr. 13, 2020, now U.S. Pat. No. 11,109,179, which claims the benefit under 35 U.S.C. § 371 as a U.S. National Stage Entry of International Application No. PCT/JP2018/037330, filed in the Japanese Patent Office as a Receiving Office on Oct. 5, 2018, which claims priority to Japanese Patent Application Number JP2017-203877, filed in the Japanese Patent Office on Oct. 20, 2017, each of which applications is hereby incorporated by reference in its entirety.

TECHNICAL FIELD

The present technology relates to a signal processing device, method, and program, and more particularly to a signal processing device, method, and program that can improve encoding efficiency.

BACKGROUND ART

Conventionally, an object audio technology has been used in movies, games, and the like, and encoding methods that can handle object audio have been developed. Specifically, for example, MPEG (Moving Picture Experts Group)-H Part 3: 3D audio standard, which is an international standard, and the like are known (for example, see Non-Patent Document 1).

In such an encoding method, similarly to a two-channel stereo method and a multi-channel stereo method such as 5.1 channel, which are conventional methods, a moving sound source or the like is treated as an independent audio object, and position information of the object can be encoded as metadata together with signal data of the audio object.

With this arrangement, reproduction can be performed in various viewing/listening environments with different numbers of speakers. In addition, it is possible to easily perform processing on a sound of a specific sound source during reproduction, such as adjusting the volume of the sound of the specific sound source and adding an effect to the sound of the specific sound source, which are difficult in the conventional encoding methods.

For example, in the standard of Non-Patent Document 1, a method called three-dimensional vector based amplitude panning (VBAP) (hereinafter, simply referred to as VBAP) is used for rendering processing.

This is one of rendering methods generally called panning, and is a method of performing rendering by distributing gains to three speakers closest to an audio object existing on a sphere surface, among speakers also existing on the sphere surface with a viewing/listening position as an origin.

Such rendering of audio objects by the panning is based on a premise that all the audio objects are on the sphere surface with the viewing/listening position as the origin. Therefore, the sense of distance in a case where the audio object is close to the viewing/listening position or far from the viewing/listening position is controlled only by the magnitude of the gain for the audio object.

However, in reality, if different attenuation rates depending on frequency components, reflection in a space where the audio object exists, and the like are not taken into account, expressions of the sense of distance are far from an actual experience.

In order to reflect such effects in a listening experience, it is first conceivable to physically calculate the reflection and attenuation in the space to obtain a final output audio signal. However, although such a method is effective for moving image content such as a movie that can be produced with a very long calculation time, it is difficult to use such a method in a case of rendering the audio object in real time.

In addition, in a final output obtained by physically calculating the reflection and the attenuation in the space, it is difficult to reflect an intention of a content creator. Especially for music works such as music clips, a format that easily reflects the intention of the content creator, such as applying preferred reverb processing to a vocal track or the like, is required.

CITATION LIST

Non-Patent Document

Non-Patent Document 1: INTERNATIONAL STANDARD ISO/IEC 23008-3 First edition 2015 Oct. 15 Information technology-High efficiency coding and media delivery in heterogeneous environments-Part 3: 3D audio

SUMMARY OF THE INVENTION

Problems to be Solved by the Invention

Therefore, it is desirable in a real-time reproduction to store, in a file or a transmission stream, data such as coefficients necessary for the reverb processing taking into account the reflection and the attenuation in the space for each audio object, together with the position information of the audio object, and to obtain the final output audio signal by using them.

However, storing, for each frame, reverb processing data required for each audio object in the file or the transmission stream increases a transmission rate, and requires a data transmission with high encoding efficiency.

The present technology has been made in view of such a situation, and aims to improve the encoding efficiency.

Solutions to Problems

A signal processing device according to one aspect of the present technology includes: an acquisition unit that acquires reverb information including at least one of space reverb information specific to a space around an audio object or object reverb information specific to the audio object and an audio object signal of the audio object; and a reverb processing unit that generates a signal of a reverb component of the audio object on the basis of the reverb information and the audio object signal.

A signal processing method or program according to one aspect of the present technology includes steps of: acquiring reverb information including at least one of space reverb information specific to a space around an audio object or object reverb information specific to the audio object and an audio object signal of the audio object; and generating a signal of a reverb component of the audio object on the basis of the reverb information and the audio object signal.

In one aspect of the present technology, reverb information including at least one of space reverb information specific to a space around an audio object or object reverb information specific to the audio object and an audio object signal of the audio object are acquired, and a signal of a reverb component of the audio object is generated on the basis of the reverb information and the audio object signal.

Effects of the Invention

According to one aspect of the present technology, the encoding efficiency can be improved.

Note that the effect described here is not necessarily limited, and may be any of effects described in the present disclosure.

BRIEF DESCRIPTION OF DRAWINGS

FIG. 3 is a diagram illustrating a syntax example of audio object information.

FIG. 4 is a diagram illustrating a syntax example of object reverb information and space reverb information.

MODE FOR CARRYING OUT THE INVENTION

Hereinafter, an embodiment to which the present technology is applied will be described with reference to the drawings.

First Embodiment

<Configuration Example of Signal Processing Device>

The present technology makes it possible to transmit a reverb parameter with high encoding efficiency by adaptively selecting an encoding method of the reverb parameter in accordance with a relationship between an audio object and a viewing/listening position.

Figure 1:
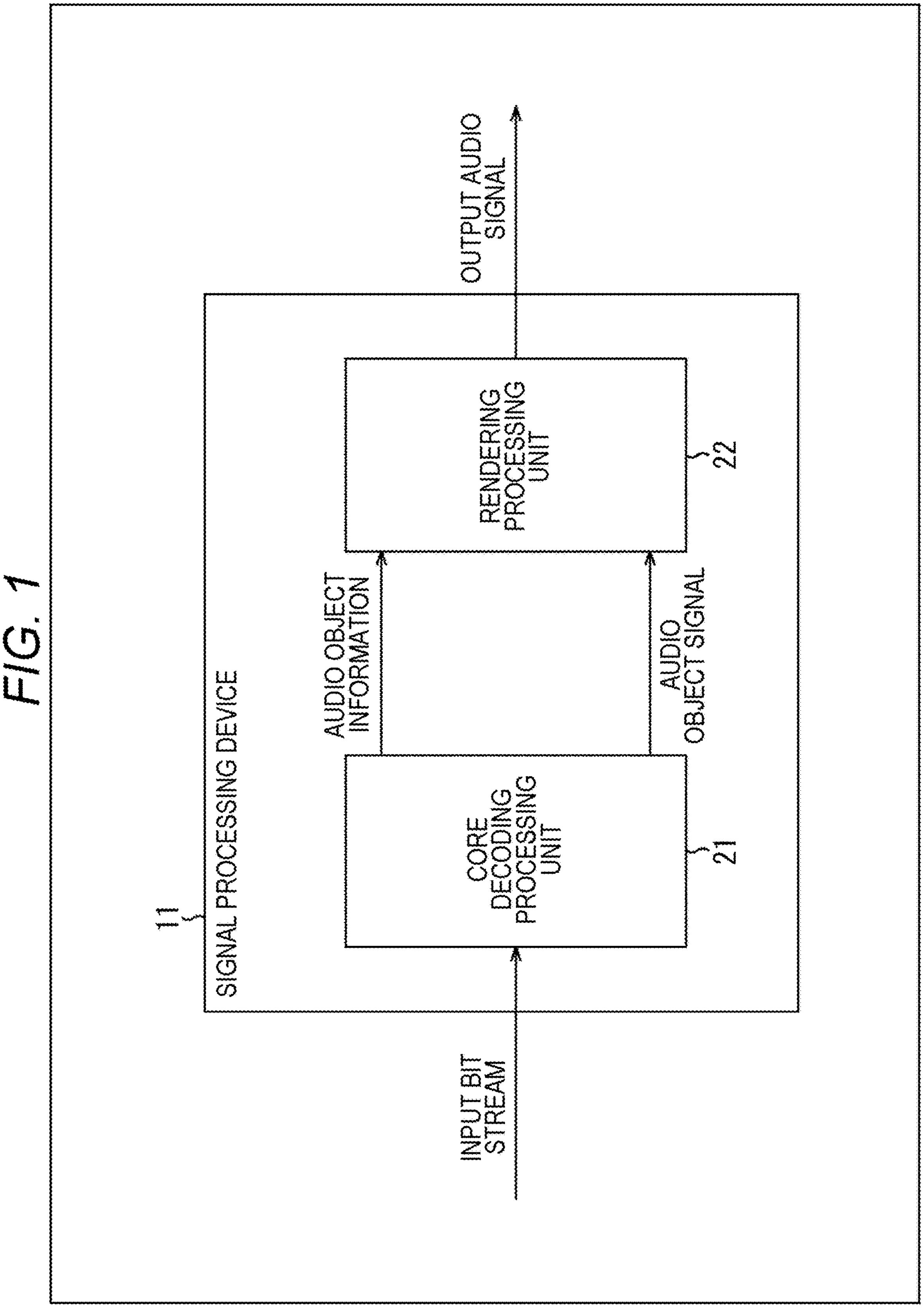
FIG. 1 is a diagram illustrating a configuration example of a signal processing device.

FIG. 1 is a diagram illustrating a configuration example of an embodiment of a signal processing device to which the present technology is applied.

A signal processing device 11 illustrated in FIG. 1 includes a core decoding processing unit 21 and a rendering processing unit 22.

The core decoding processing unit 21 receives and decodes an input bit stream that has been transmitted, and supplies the thus-obtained audio object information and audio object signal to the rendering processing unit 22. In other words, the core decoding processing unit 21 functions as an acquisition unit that acquires the audio object information and the audio object signal.

Here, the audio object signal is an audio signal for reproducing a sound of the audio object.

In addition, the audio object information is metadata of the audio object, that is, the audio object signal. The audio object information includes information regarding the audio object, which is necessary for processing performed by the rendering processing unit 22.

Specifically, the audio object information includes object position information, a direct sound gain, object reverb information, an object reverb sound gain, space reverb information, and a space reverb gain.

Here, the object position information is information indicating a position of the audio object in a three-dimensional space. For example, the object position information includes a horizontal angle indicating a horizontal position of the audio object viewed from a viewing/listening position as a reference, a vertical angle indicating a vertical position of the audio object viewed from the viewing/listening position, and a radius indicating a distance from the viewing/listening position to the audio object.

In addition, the direct sound gain is a gain value used for a gain adjustment when a direct sound component of the sound of the audio object is generated.

For example, when rendering the audio object, that is, the audio object signal, the rendering processing unit 22 generates a signal of the direct sound component from the audio object, a signal of an object-specific reverb sound, and a signal of a space-specific reverb sound.

In particular, the signal of the object-specific reverb sound or the space-specific reverb sound is a signal of a component such as a reflected sound or a reverberant sound of the sound from the audio object, that is, a signal of a reverb component obtained by performing reverb processing on the audio object signal.

The object-specific reverb sound is an initial reflected sound component of the sound of the audio object, and is a sound to which contribution of a state of the audio object, such as the position of the audio object in the three-dimensional space, is large. That is, the object-specific reverb sound is a reverb sound depending on the position of the audio object, which greatly changes depending on a relative positional relationship between the viewing/listening position and the audio object.

On the other hand, the space-specific reverb sound is a rear reverberation component of the sound of the audio object, and is a sound to which contribution of the state of the audio object is small and contribution of a state of an environment around the audio object, that is, a space around the audio object is large.

That is, the space-specific reverb sound greatly changes depending on a relative positional relationship between the viewing/listening position and a wall and the like in the space around the audio object, materials of the wall and a floor, and the like, but hardly changes depending on the relative positional relationship between the viewing/listening position and the audio object. Therefore, it can be said that the space-specific reverb sound is a sound that depends on the space around the audio object.

At the time of rendering processing in the rendering processing unit 22, such a direct sound component from the audio object, an object-specific reverb sound component, and a space-specific reverb sound component are generated by the reverb processing on the audio object signal. The direct sound gain is used to generate such a direct sound component signal.

The object reverb information is information regarding the object-specific reverb sound. For example, the object reverb information includes object reverb position information indicating a localization position of a sound image of the object-specific reverb sound, and coefficient information used for generating the object-specific reverb sound component during the reverb processing.

Since the object-specific reverb sound is a component specific to the audio object, it can be said that the object reverb information is reverb information specific to the audio object, which is used for generating the object-specific reverb sound component during the reverb processing.

Note that, hereinafter, the localization position of the sound image of the object-specific reverb sound in the three-dimensional space, which is indicated by the object reverb position information, is also referred to as an object reverb component position. It can be said that the object reverb component position is an arrangement position in the three-dimensional space of a real speaker or a virtual speaker that outputs the object-specific reverb sound.

Furthermore, the object reverb sound gain included in the audio object information is a gain value used for a gain adjustment of the object-specific reverb sound.

The space reverb information is information regarding the space-specific reverb sound. For example, the space reverb information includes space reverb position information indicating a localization position of a sound image of the space-specific reverb sound, and coefficient information used for generating a space-specific reverb sound component during the reverb processing.

Since the space-specific reverb sound is a space-specific component to which contribution of the audio object is low, it can be said that the space reverb information is reverb information specific to the space around the audio object, which is used for generating the space-specific reverb sound component during the reverb processing.

Note that, hereinafter, the localization position of the sound image of the space-specific reverb sound in the three-dimensional space indicated by the space reverb position information is also referred to as a space reverb component position. It can be said that the space reverb component position is an arrangement position of a real speaker or a virtual speaker that outputs the space-specific reverb sound in the three-dimensional space.

In addition, the space reverb gain is a gain value used for a gain adjustment of the object-specific reverb sound.

The audio object information output from the core decoding processing unit 21 includes at least the object position information among the object position information, the direct sound gain, the object reverb information, the object reverb sound gain, the space reverb information, and the space reverb gain.

The rendering processing unit 22 generates an output audio signal on the basis of the audio object information and the audio object signal supplied from the core decoding processing unit 21, and supplies the output audio signal to a speaker, a recording unit, or the like at a latter part.

That is, the rendering processing unit 22 performs the reverb processing on the basis of the audio object information, and generates, for each audio object, one or a plurality of signals of the direct sound, signals of the object-specific reverb sound, and signals of the space-specific reverb sound.

Then, the rendering processing unit 22 performs the rendering processing by VBAP for each signal of the obtained direct sound, object-specific reverb sound, and space-specific reverb sound, and generates the output audio signal having a channel configuration corresponding to a reproduction apparatus such as a speaker system or a headphone serving as an output destination. Furthermore, the rendering processing unit 22 adds signals of the same channel included in the output audio signal generated for each signal to obtain one final output audio signal.

When a sound is reproduced on the basis of the thus-obtained output audio signal, a sound image of the direct sound of the audio object is localized at a position indicated by the object position information, the sound image of the object-specific reverb sound is localized at the object reverb component position, and the sound image of the space-specific reverb sound is localized at the space reverb component position. As a result, more realistic audio reproduction in which the sense of distance of the audio object is appropriately controlled is achieved.

<Configuration Example of Rendering Processing Unit>

Next, a more detailed configuration example of the rendering processing unit 22 of the signal processing device 11 illustrated in FIG. 1 will be described.

Here, a case where there are two audio objects will be described as a specific example. Note that there may be any number of audio objects, and it is possible to handle as many audio objects as calculation resources allow.

Hereinafter, in a case where two audio objects are distinguished, one audio object is also described as an audio object OBJ1, and an audio object signal of the audio object OBJ1 is also described as an audio object signal OA1. Furthermore, the other audio object is also described as an audio object OBJ2, and an audio object signal of the audio object OBJ2 is also described as an audio object signal OA2.

Furthermore, hereinafter, the object position information, the direct sound gain, the object reverb information, the object reverb sound gain, and the space reverb gain for the audio object OBJ1 are also described as object position information OP1, a direct sound gain OG1, object reverb information OR1, an object reverb sound gain RG1, and a space reverb gain SG1, in particular.

Similarly, hereinafter, the object position information, the direct sound gain, the object reverb information, the object reverb sound gain, and the space reverb gain for the audio object OBJ2 are described as object position information OP2, a direct sound gain OG2, object reverb information OR2, an object reverb sound gain RG2, and a space reverb gain SG2, in particular.

Figure 2:
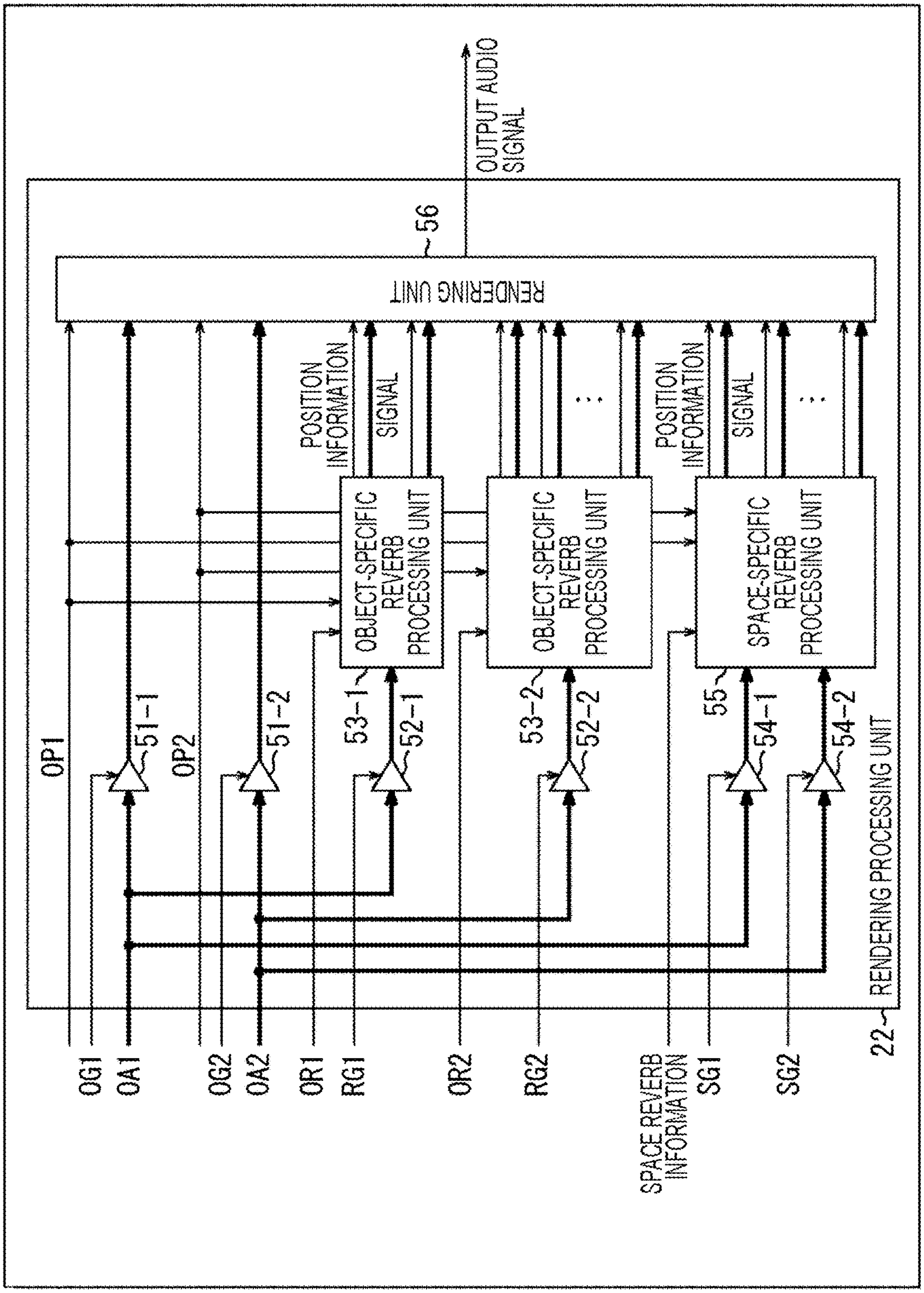
FIG. 2 is a diagram illustrating a configuration example of a rendering processing unit.

In a case where there are two audio objects as describe above, the rendering processing unit 22 is configured as illustrated in FIG. 2, for example.

In the example illustrated in FIG. 2, the rendering processing unit 22 includes an amplification unit 51-1, an amplification unit 51-2, an amplification unit 52-1, an amplification unit 52-2, an object-specific reverb processing unit 53-1, an object-specific reverb processing unit 53-2, an amplification unit 54-1, an amplification unit 54-2, a space-specific reverb processing unit 55, and a rendering unit 56.

The amplification unit 51-1 and the amplification unit 51-2 multiply the direct sound gain OG1 and the direct sound gain OG2 supplied from the core decoding processing unit 21 by the audio object signal OA1 and the audio object signal OA2 supplied from the core decoding processing unit 21, to perform a gain adjustment. The thus-obtained signals of direct sounds of the audio objects are supplied to the rendering unit 56.

Note that, hereinafter, in a case where it is not necessary to particularly distinguish the amplification unit 51-1 and the amplification unit 51-2, the amplification unit 51-1 and the amplification unit 51-2 are also simply referred to as an amplification unit 51.

The amplification unit 52-1 and the amplification unit 52-2 multiply the object reverb sound gain RG1 and the object reverb sound gain RG2 supplied from the core decoding processing unit 21 by the audio object signal OA1 and the audio object signal OA2 supplied from the core decoding processing unit 21, to perform a gain adjustment. With this gain adjustment, the loudness of each object-specific reverb sound is adjusted.

The amplification unit 52-1 and the amplification unit 52-2 supply the gain-adjusted audio object signal OA1 and audio object signal OA2 to the object-specific reverb processing unit 53-1 and the object-specific reverb processing unit 53-2.

Note that, hereinafter, in a case where it is not necessary to particularly distinguish the amplification unit 52-1 and the amplification unit 52-2, the amplification unit 52-1 and the amplification unit 52-2 are also simply referred to as an amplification unit 52.

The object-specific reverb processing unit 53-1 performs the reverb processing on the gain-adjusted audio object signal OA1 supplied from the amplification unit 52-1 on the basis of the object reverb information OR1 supplied from the core decoding processing unit 21.

Through the reverb processing, one or a plurality of signals of the object-specific reverb sound for the audio object OBJ1 is generated.

In addition, the object-specific reverb processing unit 53-1 generates position information indicating an absolute localization position of a sound image of each object-specific reverb sound in the three-dimensional space on the basis of the object position information OP1 supplied from the core decoding processing unit 21 and the object reverb position information included in the object reverb information OR1.

As described above, the object position information OP1 is information including a horizontal angle, a vertical angle, and a radius indicating an absolute position of the audio object OBJ1 based on the viewing/listening position in the three-dimensional space.

On the other hand, the object reverb position information can be information indicating an absolute position (localization position) of the sound image of the object-specific reverb sound viewed from the viewing/listening position in the three-dimensional space, or information indicating a relative position (localization position) of the sound image of the object-specific reverb sound relative to the audio object OBJ1 in the three-dimensional space.

For example, in a case where the object reverb position information is the information indicating the absolute position of the sound image of the object-specific reverb sound viewed from the viewing/listening position in the three-dimensional space, the object reverb position information is information including a horizontal angle, a vertical angle, and a radius indicating an absolute localization position of the sound image of the object-specific reverb sound based on the viewing/listening position in the three-dimensional space.

In this case, the object-specific reverb processing unit 53-1 uses the object reverb position information as it is as the position information indicating the absolute position of the sound image of the object-specific reverb sound.

On the other hand, in a case where the object reverb position information is the information indicating the relative position of the sound image of the object-specific reverb sound relative to the audio object OBJ1, the object reverb position information is information including a horizontal angle, a vertical angle, and a radius indicating the relative position of the sound image of the object-specific reverb sound viewed from the viewing/listening position in the three-dimensional space relative to the audio object OBJ1.

In this case, on the basis of the object position information OP1 and the object reverb position information, the object-specific reverb processing unit 53-1 generates information including the horizontal angle, the vertical angle, and the radius indicating the absolute localization position of the sound image of the object-specific reverb sound based on the viewing/listening position in the three-dimensional space as the position information indicating the absolute position of the sound image of the object-specific reverb sound.

The object-specific reverb processing unit 53-1 supplies, to the rendering unit 56, a pair of a signal and position information of the object-specific reverb sound obtained for each of one or a plurality of object-specific reverb sounds in this manner.

As described above, the signal and the position information of the object-specific reverb sound are generated by the reverb processing, and thus the signal of each object-specific reverb sound can be handled as an independent audio object signal.

Similarly, the object-specific reverb processing unit 53-2 performs the reverb processing on the gain-adjusted audio object signal OA2 supplied from the amplification unit 52-2 on the basis of the object reverb information OR2 supplied from the core decoding processing unit 21.

Through the reverb processing, one or a plurality of signals of the object-specific reverb sound for the audio object OBJ2 is generated.

In addition, the object-specific reverb processing unit 53-2 generates position information indicating an absolute localization position of a sound image of each object-specific reverb sound in the three-dimensional space on the basis of the object position information OP2 supplied from the core decoding processing unit 21 and the object reverb position information included in the object reverb information OR2.

The object-specific reverb processing unit 53-2 then supplies, to the rendering unit 56, a pair of a signal and position information of the object-specific reverb sound obtained in this manner.

Note that, hereinafter, in a case where it is not necessary to particularly distinguish the object-specific reverb processing unit 53-1 and the object-specific reverb processing unit 53-2, the object-specific reverb processing unit 53-1 and the object-specific reverb processing unit 53-2 are also simply referred to as an object-specific reverb processing unit 53.

The amplification unit 54-1 and the amplification unit 54-2 multiply the space reverb gain SG1 and the space reverb gain SG2 supplied from the core decoding processing unit 21 by the audio object signal OA1 and the audio object signal OA2 supplied from the core decoding processing unit 21, to perform a gain adjustment. With this gain adjustment, the loudness of each space-specific reverb sound is adjusted.

In addition, the amplification unit 54-1 and the amplification unit 54-2 supply the gain-adjusted audio object signal OA1 and audio object signal OA2 to the space-specific reverb processing unit 55.

Note that, hereinafter, in a case where it is not necessary to particularly distinguish the amplification unit 54-1 and the amplification unit 54-2, the amplification unit 54-1 and the amplification unit 54-2 are also simply referred to as an amplification unit 54.

The space-specific reverb processing unit 55 performs the reverb processing on the gain-adjusted audio object signal OA1 and audio object signal OA2 supplied from the amplification unit 54-1 and the amplification unit 54-2, on the basis of the space reverb information supplied from the core decoding processing unit 21. Furthermore, the space-specific reverb processing unit 55 generates a signal of the space-specific reverb sound by adding signals obtained by the reverb processing for the audio object OBJ1 and the audio object OBJ2. The space-specific reverb processing unit 55 generates one or plurality of signals of the space-specific reverb sound.

Furthermore, as in the case of the object-specific reverb processing unit 53, the space-specific reverb processing unit 55 generates as position information indicating an absolute localization position of a sound image of the space-specific reverb sound, on the basis of the space reverb position information included in the space reverb information supplied from the core decoding processing unit 21, the object position information OP1, and the object position information OP2.

This position information is, for example, information including a horizontal angle, a vertical angle, and a radius indicating the absolute localization position of the sound image of the space-specific reverb sound based on the viewing/listening position in the three-dimensional space.

The space-specific reverb processing unit 55 supplies, to the rendering unit 56, a pair of a signal and position information of the space-specific reverb sound for one or a plurality of space-specific reverb sounds obtained in this way. Note that the space-specific reverb sounds can be treated as independent audio object signals because they have position information, similarly to the object-specific reverb sound.

The amplification unit 51 through the space-specific reverb processing unit 55 described above function as processing blocks that constitute a reverb processing unit that is provided before the rendering unit 56 and performs the reverb processing on the basis of the audio object information and the audio object signal.

The rendering unit 56 performs the rendering processing by VBAP on the basis of each sound signal that is supplied and position information of each sound signal, and generates and outputs the output audio signal including signals of each channel having a predetermined channel configuration.

That is, the rendering unit 56 performs the rendering processing by VBAP on the basis of the object position information supplied from the core decoding processing unit 21 and the signal of the direct sound supplied from the amplification unit 51, and generates the output audio signal of each channel for each of the audio object OBJ1 and the audio object OBJ2.

Furthermore, the rendering unit 56 performs, on the basis of the pair of the signal and the position information of the object-specific reverb sound supplied from the object-specific reverb processing unit 53, the rendering processing by VBAP for each pair and generates the output audio signal of each channel for each object-specific reverb sound.

Furthermore, the rendering unit 56 performs, on the basis of the pair of the signal and the position information of the space-specific reverb sound supplied from the space-specific reverb processing unit 55, the rendering processing by VBAP for each pair and generates the output audio signal of each channel for each space-specific reverb sound.

Then, the rendering unit 56 adds signals of the same channel included in the output audio signal obtained for each of the audio object OBJ1, the audio object OBJ2, the object-specific reverb sound, and the space-specific reverb sound, to obtain a final output audio signal.

<Format Example of Input Bit Stream>

Here, a format example of the input bit stream supplied to the signal processing device 11 will be described.

For example, a format (syntax) of the input bit stream is as illustrated in FIG. 3. In the example illustrated in FIG. 3, a portion indicated by characters "object_metadata( )" is metadata of the audio object, that is, a portion of the audio object information.

The portion of the audio object information includes object position information regarding audio objects for the number of the audio objects indicated by characters "num_objects". In this example, a horizontal angle position_azimuth[i], a vertical angle position_elevation[i], and a radius position_radius[i] are stored as object position information of an i-th audio object.

Furthermore, the audio object information includes a reverb information flag that is indicated by characters "flag_obj_reverb" and indicates whether or not the reverb information such as the object reverb information and the space reverb information is included.

Here, in a case where a value of the reverb information flag flag_obj_reverb is "1", it indicates that the audio object information includes the reverb information.

In other words, in the case where the value of the reverb information flag flag_obj_reverb is "1", it can be said that the reverb information including at least one of the space reverb information or the object reverb information is stored in the audio object information.

Note that, in more detail, depending on a value of a reuse flag use_prev described later, there is a case where the audio object information includes, as the reverb information, identification information for identifying past reverb information, that is, a reverb ID described later, and does not include the object reverb information or the space reverb information.

On the other hand, in a case where the value of the reverb information flag flag_obj_reverb is "0", it indicates that the audio object information does not include the reverb information.

In the case where the value of the reverb information flag flag_obj_reverb is "1", in the audio object information, a direct sound gain indicated by characters "dry_gain[i]", an object reverb sound gain indicated by characters "wet_gain[i]", and a space reverb gain indicated by characters "room_gain[i]" are each stored for the number of the audio objects, as the reverb information.

The direct sound gain dry_gain[i], the object reverb sound gain wet_gain[i], and the space reverb gain room_gain[i] determine a mixing ratio of the direct sound, the object-specific reverb sound, and the space-specific reverb sound in the output audio signal.

Furthermore, in the audio object information, the reuse flag indicated by the characters "use_prev" is stored as the reverb information.

The reuse flag use_prev is flag information indicating whether or not to reuse, as the object reverb information of the i-th audio object, past object reverb information specified by a reverb ID.

Here, a reverb ID is given to each object reverb information transmitted in the input bit stream as identification information for identifying (specifying) the object reverb information.

For example, when the value of the reuse flag use_prev is "1", it indicates that the past object reverb information is reused. In this case, in the audio object information, a reverb ID that is indicated by characters "reverb_data_id [i]" and indicates object reverb information to be reused is stored.

On the other hand, when the value of the reuse flag use_prev is "0", it indicates that the object reverb information is not reused. In this case, in the audio object information, object reverb information indicated by characters "obj_reverb_data(i)" is stored.

Furthermore, in the audio object information, a space reverb information flag indicated by characters "flag_room_reverb" is stored as the reverb information.

The space reverb information flag flag_room_reverb is a flag indicating the presence or absence of the space reverb information. For example, in a case where a value of the space reverb information flag flag_room_reverb is "1", it indicates that there is the space reverb information, and space reverb information indicated by characters "room_reverb_data(i)" is stored in the audio object information.

On the other hand, in a case where the value of the space reverb information flag flag_room_reverb is "0", it indicates that there is no space reverb information, and in this case, no space reverb information is stored in the audio object information. Note that, similarly to the case of the object reverb information, the reuse flag may be stored for the space reverb information, and the space reverb information may be appropriately reused.

Furthermore, a format (syntax) of portions of the object reverb information obj_reverb_data(i) and the space reverb information room_reverb_data(i) in the audio object information of the input bit stream is as illustrated in FIG. 4, for example.

In the example illustrated in FIG. 4, a reverb ID indicated by characters "reverb_data_id", the number of object-specific reverb sound components to be generated indicated by characters "num_out", and a tap length indicated by characters "len_ir" are included as the object reverb information.

Note that, in this example, it is assumed that coefficients of an impulse response are stored as the coefficient information used for generating the object-specific reverb sound components, and the tap length len_ir indicates a tap length of the impulse response, that is, the number of the coefficients of the impulse response.

Furthermore, the object reverb position information of the object-specific reverb sounds for the number num_out of the object-specific reverb sound components to be generated is included as the object reverb information.

That is, a horizontal angle position_azimuth[i], a vertical angle position_elevation[i], and a radius position_radius[i] are stored as object reverb position information of an i-th object-specific reverb sound component.

Furthermore, as coefficient information of the i-th object-specific reverb sound component, coefficients of the impulse response impulse_response[i][j] are stored for the number of the tap lengths len_ir.

On the other hand, the number of space-specific reverb sound components to be generated indicated by characters "num_out" and a tap length indicated by characters "len_ir" are included as the space reverb information. The tap length len_ir is a tap length of an impulse response as coefficient information used for generating the space-specific reverb sound components.

Furthermore, space reverb position information of the space-specific reverb sounds for the number num_out of the space-specific reverb sound components to be generated is included as the space reverb information.

That is, a horizontal angle position_azimuth[i], a vertical angle position_elevation[i], and a radius position_radius[i] are stored as space reverb position information of the i-th space-specific reverb sound component.

Furthermore, as coefficient information of the i-th space-specific reverb sound component, coefficients of the impulse response impulse_response[i] [j] are stored for the number of the tap lengths len_ir.

Note that, in the examples illustrated in FIGS. 3 and 4, examples have been described in which the impulse responses are used as the coefficient information used for generating the object-specific reverb sound components and the space-specific reverb sound components. That is, the examples in which the reverb processing using a sampling reverb is performed have been described. However, the present technology is not limited to this, and the reverb processing may be performed using a parametric reverb or the like. Furthermore, the coefficient information may be compressed by use of a lossless encoding technique such as Huffman coding.

As described above, in the input bit stream, information necessary for the reverb processing is divided into information regarding the direct sound (direct sound gain), information regarding the object-specific reverb sound such as the object reverb information, and information regarding the space-specific reverb sound such as the space reverb information, and the information obtained by the division is transmitted.

Therefore, it is possible to mix and output information at an appropriate transmission frequency for each piece of information such as the information regarding the direct sound, the information regarding the object-specific reverb sound, and the information regarding the space-specific reverb sound. That is, in each frame of the audio object signal, it is possible to selectively transmit only necessary information, from pieces of information such as the information regarding the direct sound, on the basis of the relationship between the audio object and the viewing/listening position, for example. As a result, a bit rate of the input bit stream can be reduced, and more efficient information transmission can be achieved. That is, the encoding efficiency can be improved.

<About Output Audio Signal>

Next, the direct sound, the object-specific reverb sound, and the space-specific reverb sound for the audio object reproduced on the basis of the output audio signal will be described.

Figure 5:
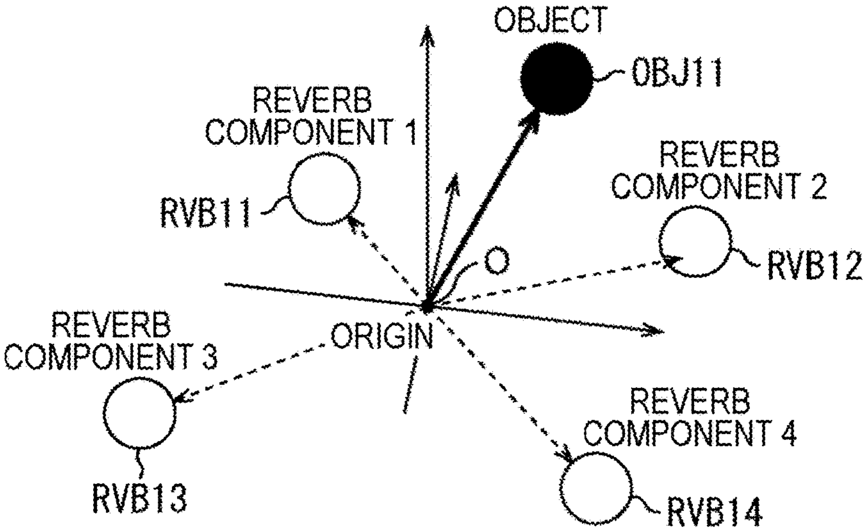
FIG. 5 is a diagram illustrating a localization position of a reverb component.

A relationship between the position of the audio object and the object reverb component positions is, for example, as illustrated in FIG. 5.

Here, around a position OBJ11 of one audio object, there are an object reverb component position RVB11 to an object reverb component position RVB14 of four object-specific reverb sounds for the audio object.

Here, a horizontal angle (azimuth) and a vertical angle (elevation) indicating the object reverb component position RVB11 to the object reverb component position RVB14 are illustrated on an upper side in the drawing. In this example, it can be seen that four object-specific reverb sound components are arranged around an origin O, which is the viewing/listening position.

Where the localization position of the object-specific reverb sound is and what type of sound the object-specific reverb sound is greatly differ depending on the position of the audio object in the three-dimensional space. Therefore, it can be said that the object reverb information is the reverb information that depends on the position of the audio object in the space.

Therefore, in the input bit stream, the object reverb information is not linked to the audio object, but is managed by the reverb ID.

When the object reverb information is read out from the input bit stream, the core decoding processing unit 21 holds the read-out object reverb information for a certain period. That is, the core decoding processing unit 21 always holds the object reverb information for a past predetermined period.

For example, it is assumed that the value of the reuse flag use_prev is "1" at a predetermined time, and an instruction is made to reuse the object reverb information.

In this case, the core decoding processing unit 21 acquires a reverb ID for a predetermined audio object from the input bit stream. That is, the reverb ID is read out.

The core decoding processing unit 21 then reads out object reverb information specified by the read-out reverb ID from the past object reverb information held by the core decoding processing unit 21 and reuses the object reverb information as object reverb information regarding the predetermined audio object at the predetermined time.

By managing the object reverb information with the reverb ID in this manner, for example, the object reverb information transmitted as for the audio object OBJ1 can be also reused as for the audio object OBJ2. Therefore, the number of pieces of the object reverb information temporarily held in the core decoding processing unit 21, that is, a data amount can be further reduced.

Figure 6:
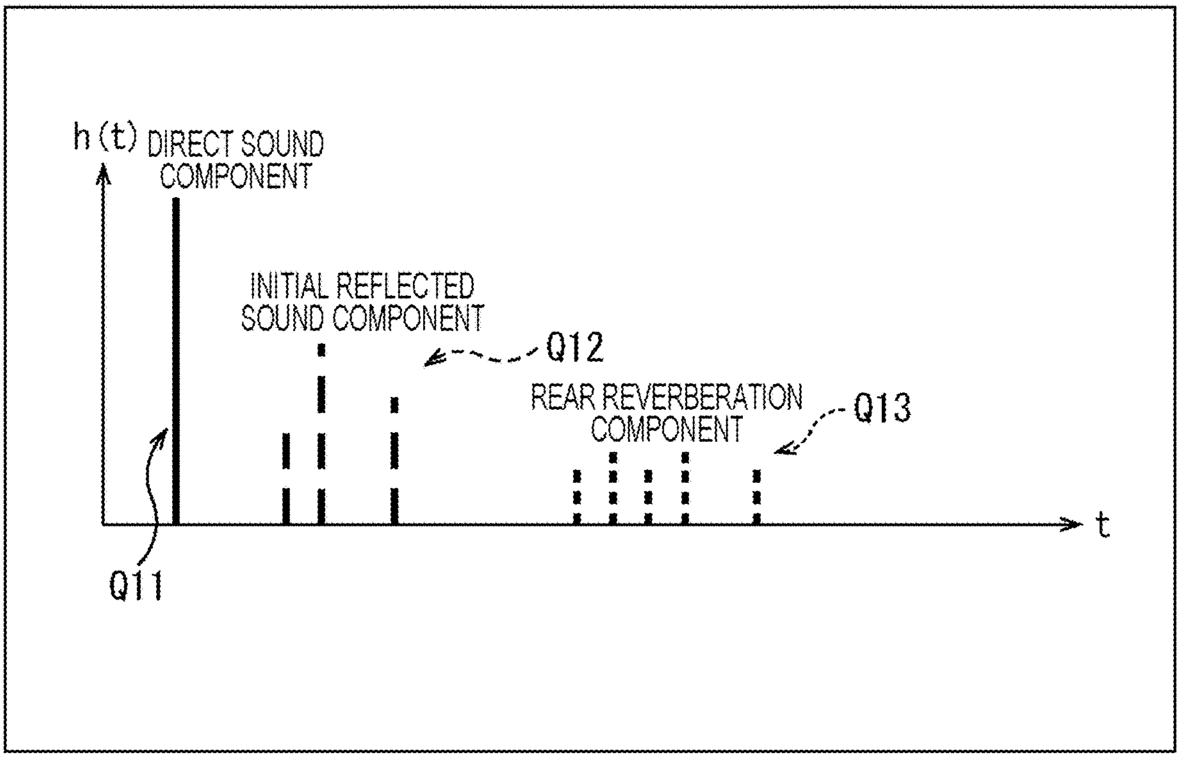
FIG. 6 is a diagram illustrating an impulse response.

By the way, generally, in a case where an impulse is emitted into a space, for example, as illustrated in FIG. 6, an initial reflected sound is generated by reflection by a floor, a wall, and the like existing in a surrounding space, and a rear reverberation component generated by a repetition of the reflection is also generated, in addition to the direct sound.

Here, a portion indicated by an arrow Q11 indicates the direct sound component, and the direct sound component corresponds to the signal of the direct sound obtained by the amplification unit 51.

In addition, a portion indicated by an arrow Q12 indicates the initial reflected sound component, and the initial reflected sound component corresponds to the signal of the object-specific reverb sound obtained by the object-specific reverb processing unit 53. Furthermore, a portion indicated by an arrow Q13 indicates the rear reverberation component, and the rear reverberation component corresponds to the signal of the space-specific reverb sound obtained by the space-specific reverb processing unit 55.

Figure 7:
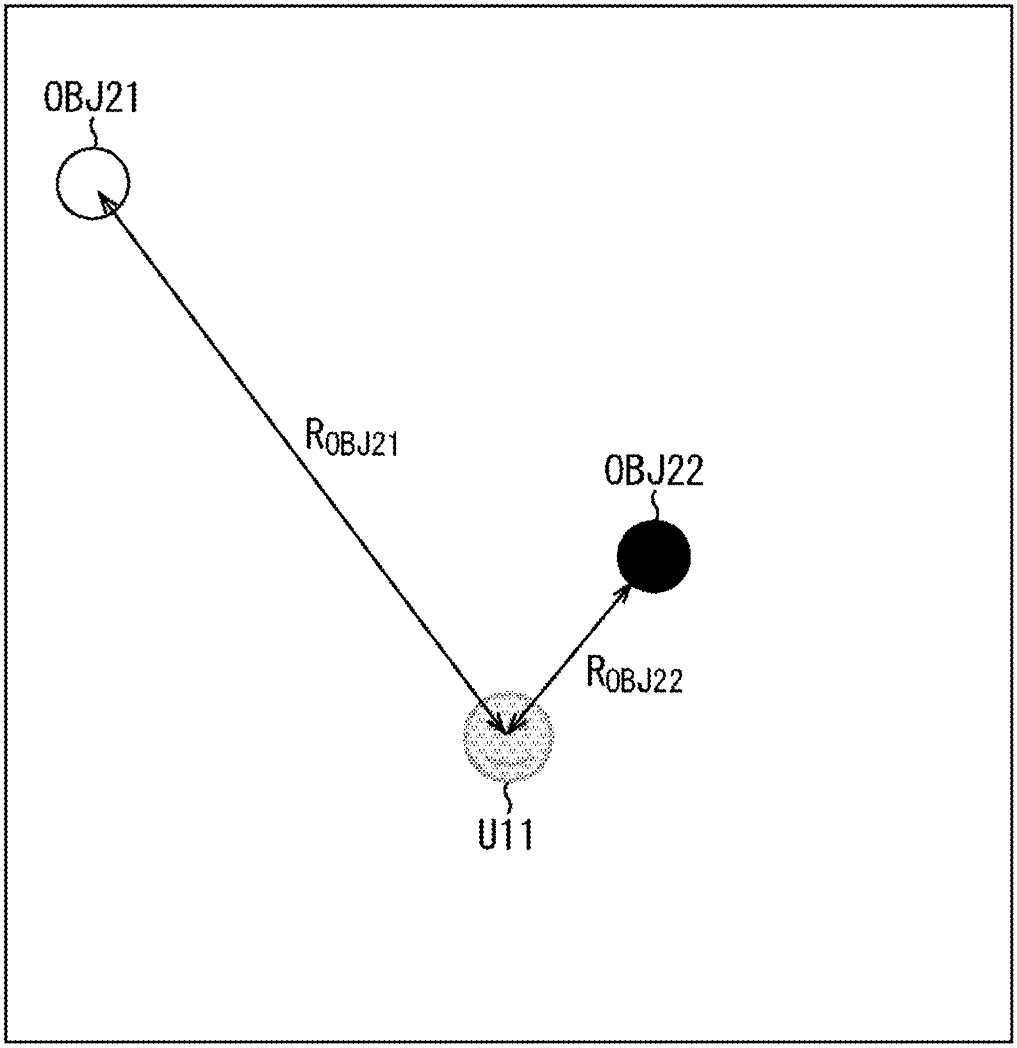
FIG. 7 is a diagram illustrating a relationship between an audio object and a viewing/listening position.
Figure 8:
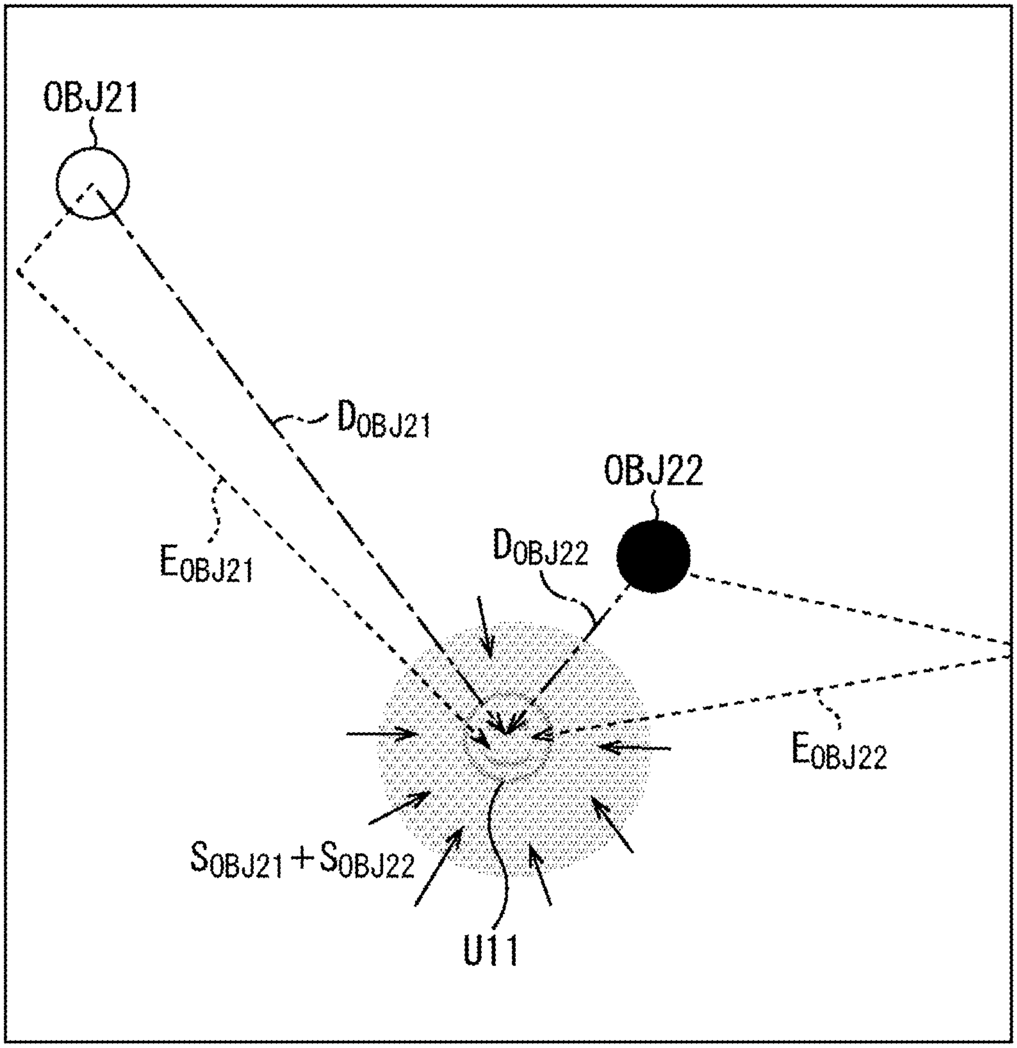
FIG. 8 is a diagram illustrating a direct sound component, an initial reflected sound component, and a rear reverberation component.

Such a relationship among the direct sound, the initial reflected sound, and the rear reverberation component is as illustrated in FIGS. 7 and 8, for example, if it is described on a two-dimensional plane. Note that, in FIGS. 7 and 8, portions corresponding to each other are denoted by the same reference numerals, and a description thereof will be omitted as appropriate.

For example, as illustrated in FIG. 7, it is assumed that there are two audio objects OBJ21 and OBJ22 in an indoor space surrounded by a wall represented by a rectangular frame. It is also assumed that a viewer/listener U11 is at a reference viewing/listening position.

Here, it is assumed that a distance from the viewer/listener U11 to the audio object OBJ21 is $R_{OBJ21}$, and a distance from the viewer/listener U11 to the audio object OBJ22 is $R_{OBJ22}$.

In such a case, as illustrated in FIG. 8, a sound that is drawn by a dashed line arrow in the drawing, generated at the audio object OBJ21, and directed toward the viewer/listener U11 directly is a direct sound $D_{OBJ21}$ of the audio object OBJ21. Similarly, a sound that is drawn by a dashed line arrow in the drawing, generated at the audio object OBJ22, and directed toward the viewer/listener U11 directly is a direct sound $D_{OBJ22}$ of the audio object OBJ22.

Furthermore, a sound that is drawn by a dotted arrow in the drawing, generated at the audio object OBJ21, and directed toward the viewer/listener U11 after being reflected once by an indoor wall or the like is an initial reflected sound $E_{OBJ21}$ of the audio object OBJ21. Similarly, a sound that is drawn by a dotted arrow in the drawing, generated at the audio object OBJ22, and directed toward the viewer/listener U11 after being reflected once by the indoor wall or the like is an initial reflected sound $E_{OBJ22}$ of the audio object OBJ22.

Furthermore, a component of a sound including a sound $S_{OBJ21}$ and a sound $S_{OBJ22}$ is the rear reverberation component. The sound $S_{OBJ21}$ is generated at the audio object OBJ21 and repeatedly reflected by the indoor wall or the like to reach the viewer/listener U11. The sound $S_{OBJ22}$ is generated at the audio object OBJ22, and repeatedly reflected by the indoor wall or the like to reach the viewer/listener U11. Here, the rear reverberation component is drawn by a solid arrow.

Here, the distance $R_{OBJ22}$ is shorter than the distance $R_{OBJ21}$, and the audio object OBJ22 is closer to the viewer/listener U11 than the audio object OBJ21.

As a result, as for the audio object OBJ22, the direct sound $D_{OBJ22}$ is more dominant than the initial reflected sound $E_{OBJ22}$ as a sound that can be heard by the viewer/listener U11. Therefore, for a reverb of the audio object OBJ22, the direct sound gain is set to a large value, the object reverb sound gain and the space reverb gain are set to small values, and these gains are stored in the input bit stream.

On the other hand, the audio object OBJ21 is farther from the viewer/listener U11 than the audio object OBJ22.

As a result, as for the audio object OBJ21, the initial reflected sound $E_{OBJ21}$ and the sound $S_{OBJ21}$ of the rear reverberation component are more dominant than the direct sound $D_{OBJ21}$ as the sound that can be heard by the viewer/listener U11. Therefore, for a reverb of the audio object OBJ21, the direct sound gain is set to a small value, the object reverb sound gain and the space reverb gain are set to large values, and these gains are stored in the input bit stream.

Furthermore, in a case where the audio object OBJ21 or the audio object OBJ22 moves, the initial reflected sound component largely changes depending on a positional relationship between positions of the audio objects and positions of the wall and the floor of a room, which is the surrounding space.

Therefore, it is necessary to transmit the object reverb information of the audio object OBJ21 and the audio object OBJ22 at the same frequency as the object position information. Such object reverb information is information that largely depends on the positions of the audio objects.

On the other hand, since the rear reverberation component largely depends on a material or the like of the space such as the wall and the floor, a subjective quality can be sufficiently ensured by transmitting the space reverb information at a minimum required frequency, and controlling only a magnitude relationship of the rear reverberation component in accordance with the positions of the audio objects.

Therefore, for example, the space reverb information is transmitted to the signal processing device 11 at a lower frequency than the object reverb information. In other words, the core decoding processing unit 21 acquires the space reverb information at a lower frequency than a frequency of acquiring the object reverb information.

In the present technology, a data amount of information (data) required for the reverb processing can reduced by dividing the information necessary for the reverb processing for each sound component such as the direct sound, the object-specific reverb sound, and the space-specific reverb sound.

Generally, the sampling reverb requires a long impulse response data of about one second, but by dividing the necessary information for each sound component as in the present technology, the impulse response can be realized as a combination of a fixed delay and short impulse response data and the data amount can be reduced. With this arrangement, not only in the sampling reverb but also in the parametric reverb, the number of stages of a biquad filter can be similarly reduced.

In addition, in the present technology, the information necessary for the reverb processing can be transmitted at a required frequency by dividing the necessary information for each sound component and transmitting the information obtained by the division, thereby improving the encoding efficiency.

As described above, according to the present technology, in a case where the reverb information for controlling the sense of distance is transmitted, higher transmission efficiency can be achieved even in a case where a large number of audio objects exist, as compared with a panning-based rendering method such as VBAP.

<Description of Audio Output Processing>

Figure 9:
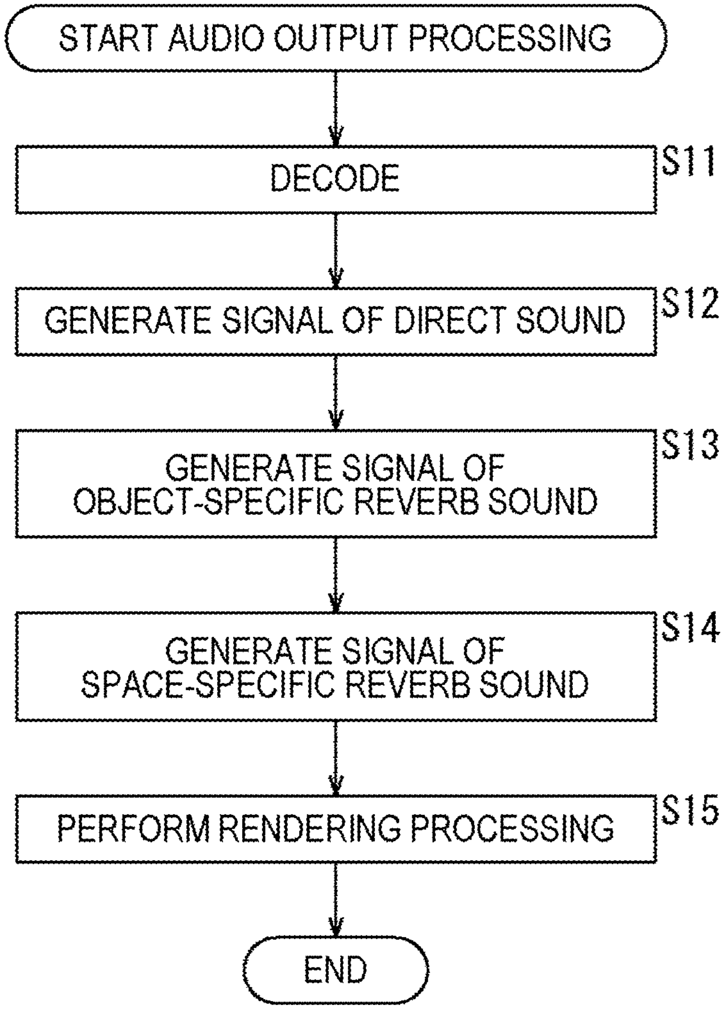
FIG. 9 is a flowchart illustrating audio output processing.

Next, a specific operation of the signal processing device 11 will be described. That is, audio output processing by the signal processing device 11 will be described below with reference to a flowchart in FIG. 9.

In step S11, the core decoding processing unit 21 decodes (data) the received input bit stream.

The core decoding processing unit 21 supplies the audio object signal obtained by the decoding to the amplification unit 51, the amplification unit 52, and the amplification unit 54, and supplies the direct sound gain, the object reverb sound gain, and the space reverb gain obtained by the decoding to the amplification unit 51, the amplification unit 52, and the amplification unit 54, respectively.

Furthermore, the core decoding processing unit 21 supplies the object reverb information and the space reverb information obtained by the decoding to the object-specific reverb processing unit 53 and the space-specific reverb processing unit 55. Furthermore, the core decoding processing unit 21 supplies the object position information obtained by the decoding to the object-specific reverb processing unit 53, the space-specific reverb processing unit 55, and the rendering unit 56.

Note that, at this time, the core decoding processing unit 21 temporarily holds the object reverb information read out from the input bit stream.

In addition, more specifically, when the value of the reuse flag use_prev is "1", the core decoding processing unit 21 supplies, to the object-specific reverb processing unit 53, the object reverb information specified by the reverb ID read out from the input bit stream from the pieces of the object reverb information held by the core decoding processing unit 21, as the object reverb information of the audio object.

In step S12, the amplification unit 51 multiplies the direct sound gain supplied from the core decoding processing unit 21 by the audio object signal supplied from the core decoding processing unit 21 to perform a gain adjustment. The amplification unit 51 thus generates the signal of the direct sound and supplies the signal of the direct sound to the rendering unit 56.

In step S13, the object-specific reverb processing unit 53 generates the signal of the object-specific reverb sound.

That is, the amplification unit 52 multiplies the object reverb sound gain supplied from the core decoding processing unit 21 by the audio object signal supplied from the core decoding processing unit 21 to perform a gain adjustment. The amplification unit 52 then supplies the gain-adjusted audio object signal to the object-specific reverb processing unit 53.

Furthermore, the object-specific reverb processing unit 53 performs the reverb processing on the audio object signal supplied from the amplification unit 52 on the basis of the coefficient of the impulse response included in the object reverb information supplied from the core decoding processing unit 21. That is, convolution processing of the coefficient of the impulse response and the audio object signal is performed to generate the signal of the object-specific reverb sound.

Furthermore, the object-specific reverb processing unit 53 generates the position information of the object-specific reverb sound on the basis of the object position information supplied from the core decoding processing unit 21 and the object reverb position information included in the object reverb information. The object-specific reverb processing unit 53 then supplies the obtained position information and signal of the object-specific reverb sound to the rendering unit 56.

In step S14, the space-specific reverb processing unit 55 generates the signal of the space-specific reverb sound.

That is, the amplification unit 54 multiplies the space reverb gain supplied from the core decoding processing unit 21 by the audio object signal supplied from the core decoding processing unit 21 to perform a gain adjustment. The amplification unit 54 then supplies the gain-adjusted audio object signal to the space-specific reverb processing unit 55.

Furthermore, the space-specific reverb processing unit 55 performs the reverb processing on the audio object signal supplied from the amplification unit 54 on the basis of the coefficient of the impulse response included in the space reverb information supplied from the core decoding processing unit 21. That is, the convolution processing of the impulse response coefficient and the audio object signal is performed, signals obtained for each audio object by the convolution processing are added, and the signal of the space-specific reverb sound is generated.

Furthermore, the space-specific reverb processing unit 55 generates the position information of the space-specific reverb sound on the basis of the object position information supplied from the core decoding processing unit 21 and the space reverb position information included in the space reverb information. The space-specific reverb processing unit 55 supplies the obtained position information and signal of the space-specific reverb sound to the rendering unit 56.

In step S15, the rendering unit 56 performs the rendering processing and outputs the obtained output audio signal.

That is, the rendering unit 56 performs the rendering processing on the basis of the object position information supplied from the core decoding processing unit 21 and the signal of the direct sound supplied from the amplification unit 51. Furthermore, the rendering unit 56 performs the rendering processing on the basis of the signal and the position information of the object-specific reverb sound supplied from the object-specific reverb processing unit 53, and performs the rendering processing on the basis of the signal and the position information of the space-specific reverb sound supplied from the space-specific reverb processing unit 55.

Then, the rendering unit 56 adds, for each channel, signals obtained by the rendering processing of each sound component to generate the final output audio signal. The rendering unit 56 outputs the thus-obtained output audio signal to a latter part, and the audio output processing ends.

As described above, the signal processing device 11 performs the reverb processing and the rendering processing on the basis of the audio object information including information divided for each component of the direct sound, the object-specific reverb sound, and the space-specific reverb sound, and generates the output audio signal. With this arrangement, the encoding efficiency of the input bit stream can be improved.

<Configuration Example of Encoding Device>

Next, an encoding device that generates and outputs the input bit stream described above as an output bit stream will be described.

Figure 10:
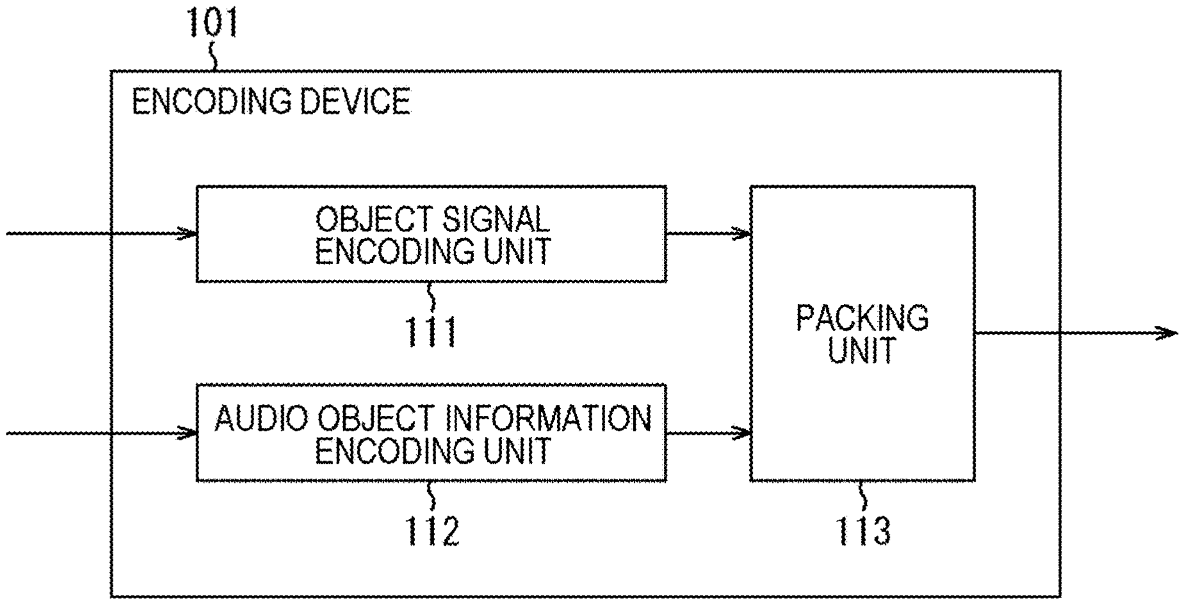
FIG. 10 is a diagram illustrating a configuration example of an encoding device.

Such an encoding device is configured, for example, as illustrated in FIG. 10.

An encoding device 101 illustrated in FIG. 10 includes an object signal encoding unit 111, an audio object information encoding unit 112, and a packing unit 113.

The object signal encoding unit 111 encodes a supplied audio object signal by a predetermined encoding method, and supplies the encoded audio object signal to the packing unit 113.

The audio object information encoding unit 112 encodes supplied audio object information and supplies the encoded audio object information to the packing unit 113.

The packing unit 113 stores, in a bit stream, the encoded audio object signal supplied from the object signal encoding unit 111 and the encoded audio object information supplied from the audio object information encoding unit 112, to obtain an output bit stream. The packing unit 113 transmits the obtained output bit stream to the signal processing device 11.

<Description of Encoding Processing>

Figure 11:
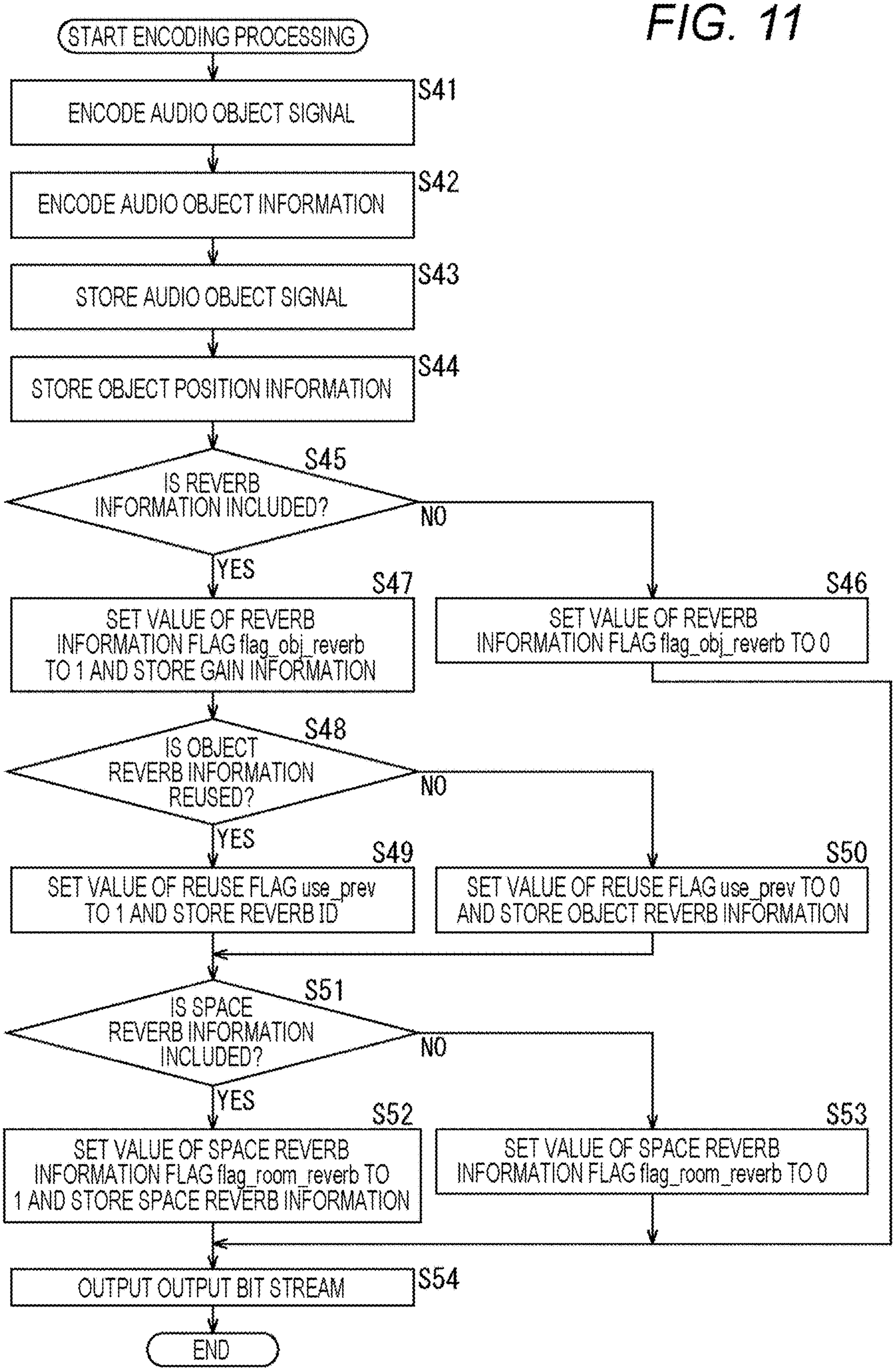
FIG. 11 is a flowchart illustrating encoding processing.

Next, an operation of the encoding device 101 will be described. That is, encoding processing performed by the encoding device 101 will be described below with reference to a flowchart in FIG. 11. For example, the encoding processing is performed for each frame of the audio object signal.

In step S41, the object signal encoding unit 111 encodes the supplied audio object signal by a predetermined encoding method, and supplies the encoded audio object signal to the packing unit 113.

In step S42, the audio object information encoding unit 112 encodes the supplied audio object information and supplies the encoded audio object information to the packing unit 113.

Here, for example, the audio object information including the object reverb information and the space reverb information is supplied and encoded so that the space reverb information is transmitted to the signal processing device 11 at a lower frequency than the object reverb information.

In step S43, the packing unit 113 stores, in the bit stream, the encoded audio object signal supplied from the object signal encoding unit 111.

In step S44, the packing unit 113 stores, in the bit stream, the object position information included in the encoded audio object information supplied from the audio object information encoding unit 112.

In step S45, the packing unit 113 determines whether or not the encoded audio object information supplied from the audio object information encoding unit 112 includes the reverb information.

Here, in a case where neither the object reverb information nor space reverb information is included as the reverb information, it is determined that the reverb information is not included.

In a case where it is determined in step S45 that the reverb information is not included, then the processing proceeds to step S46.

In step S46, the packing unit 113 sets the value of the reverb information flag flag_obj_reverb to "0" and stores the reverb information flag flag_obj_reverb in the bit stream. As a result, the output bit stream including no reverb information is obtained. After the output bit stream is obtained, the processing proceeds to step S54.

On the other hand, in a case where it is determined in step S45 that the reverb information is included, then the processing proceeds to step S47.

In step S47, the packing unit 113 sets the value of the reverb information flag flag_obj_reverb to "1", and stores, in the bit stream, the reverb information flag flag_obj_reverb and gain information included in the encoded audio object information supplied from the audio object information encoding unit 112. Here, the direct sound gain dry_gain[i], the object reverb sound gain wet_gain[i], and the space reverb gain room_gain[i] described above are stored in the bit stream as the gain information.

In step S48, the packing unit 113 determines whether or not to reuse the object reverb information.

For example, in a case where the encoded audio object information supplied from the audio object information encoding unit 112 does not include the object reverb information and includes the reverb ID, it is determined that the object reverb information is to be reused.

In a case where it is determined in step S48 that the object reverb information is to be reused, then the processing proceeds to step S49.

In step S49, the packing unit 113 sets the value of the reuse flag use_prev to "1", and stores, in the bit stream, the reuse flag use_prev and the reverb ID included in the encoded audio object information supplied from the audio object information encoding unit 112. After the reverb ID is stored, the processing proceeds to step S51.

On the other hand, in a case where it is determined in step S48 that the object reverb information is not to be reused, then the processing proceeds to step S50.

In step S50, the packing unit 113 sets the value of the reuse flag use_prev to "0", and stores, in the bit stream, the reuse flag use_prev and the object reverb information included in the encoded audio object information supplied from the audio object information encoding unit 112. After the object reverb information is stored, the processing proceeds to step S51.

After the processing of step S49 or step S50 is performed, the processing of step S51 is performed.

That is, in step S51, the packing unit 113 determines whether or not the encoded audio object information supplied from the audio object information encoding unit 112 includes the space reverb information.

In a case where it is determined in step S51 that the space reverb information is included, then the processing proceeds to step S52.

In step S52, the packing unit 113 sets the value of the space reverb information flag flag_room_reverb to "1", and stores, in the bit stream, the space reverb information flag flag_room_reverb and the space reverb information included in the encoded audio object information supplied from the audio object information encoding unit 112.

As a result, the output bit stream including the space reverb information is obtained. After the output bit stream is obtained, the processing proceeds to step S54.

On the other hand, in a case where it is determined in step S51 that the space reverb information is not included, then the processing proceeds to step S53.

In step S53, the packing unit 113 sets the value of the space reverb information flag flag_room_reverb to "0" and stores the space reverb information flag flag_room_reverb in the bit stream. As a result, the output bit stream including no space reverb information is obtained. After the output bit stream is obtained, the processing proceeds to step S54.

After the processing of step S46, step S52, or step S53 is performed to obtain the output bit stream, the processing of step S54 is performed. Note that the output bit stream obtained by these processes is, for example, a bit stream having the format illustrated in FIGS. 3 and 4.

In step S54, the packing unit 113 outputs the obtained output bit stream, and the encoding processing ends.

As described above, the encoding device 101 stores, in the bit stream, the audio object information appropriately including information divided for each component of the direct sound, the object-specific reverb sound, and the space-specific reverb sound and outputs the output bit stream. With this arrangement, the encoding efficiency of the output bit stream can be improved.

Note that, although an example has been described above in which the gain information such as the direct sound gain, the object reverb sound gain, and the space reverb gain is given as the audio object information, the gain information may be generated on a decoding side.

In such a case, for example, the signal processing device 11 generates the direct sound gain, the object reverb sound gain, and the space reverb gain on the basis of the object position information, the object reverb position information, the space reverb position information, and the like included in the audio object information.

<Configuration Example of Computer>

By the way, the above-described series of processing can be executed by hardware or software. In a case where the series of processing is executed by the software, a program constituting the software is installed in a computer. Here, the computer includes a computer incorporated in dedicated hardware, or a computer capable of executing various functions by installing various programs, for example, a general-purpose personal computer.

Figure 12:
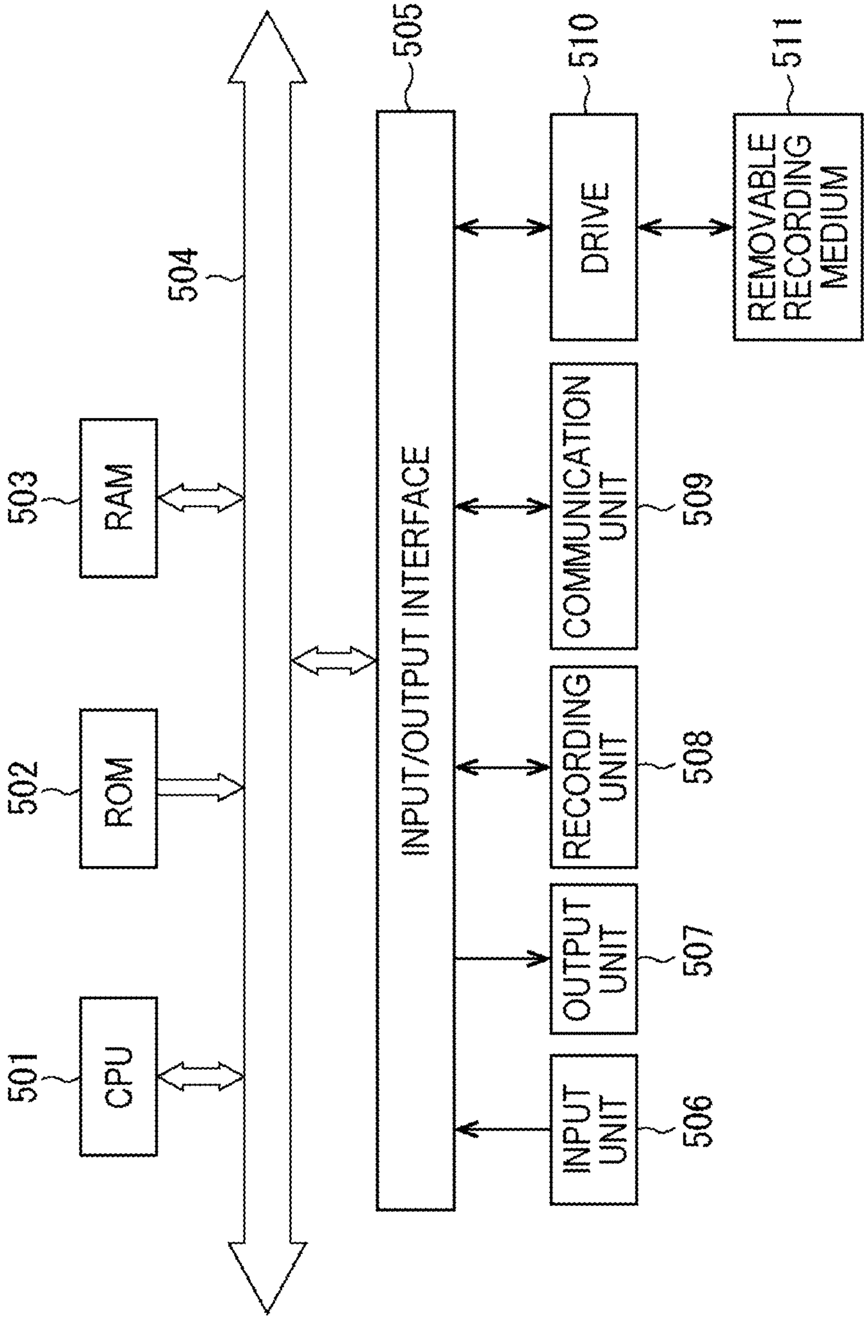
FIG. 12 is a diagram illustrating a configuration example of a computer.

FIG. 12 is a block diagram illustrating a configuration example of hardware of a computer that executes the above-described series of processing by a program.

In the computer, a central processing unit (CPU) 501, a read only memory (ROM) 502, and a random access memory (RAM) 503 are mutually connected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a keyboard, a mouse, a microphone, and an image sensor. The output unit 507 includes a display and a speaker. The recording unit 508 includes a hard disk and a nonvolatile memory. The communication unit 509 includes a network interface. The drive 510 drives a removable recording medium 511 such as a magnetic disk, an optical disk, a magneto-optical disk, or a semiconductor memory.

In the computer configured as described above, the CPU 501 loads, for example, the program recorded in the recording unit 508 to the RAM 503 via the input/output interface 505 and the bus 504, and executes the program, so that the above-described series of processing is performed.

The program executed by the computer (CPU 501) can be provided by being recorded on the removable recording medium 511 as a package medium or the like, for example. Furthermore, the program can be provided via a wired or wireless transmission medium such as a local area network, the Internet, or a digital satellite broadcasting.

In the computer, the program can be installed in the recording unit 508 via the input/output interface 505 by attaching the removable recording medium 511 to the drive 510. Furthermore, the program can be received by the communication unit 509 via the wired or wireless transmission medium and installed in the recording unit 508. In addition, the program can be installed in the ROM 502 or the recording unit 508 in advance.

Note that the program executed by the computer may be a program in which processing is performed in time series in the order described in this specification, or a program in which processing is performed in parallel or at a necessary timing such as when a call is made.

Furthermore, an embodiment of the present technology is not limited to the above-described embodiment, and various changes can be made without departing from the gist of the present technology.

For example, the present technology can have a configuration of cloud computing in which one function is shared by a plurality of devices via a network and processed jointly.

In addition, each step described in the above-described flowchart can be executed by one device or can be executed by being shared by a plurality of devices.

Furthermore, in a case where a plurality of types of processing is included in one step, the plurality of types of processing included in the one step can be executed by one device or can be executed by being shared by a plurality of devices.

Furthermore, the present technology may have following configurations.

(1)

A signal processing device including:

an acquisition unit that acquires reverb information including at least one of space reverb information specific to a space around an audio object or object reverb information specific to the audio object and an audio object signal of the audio object; and a reverb processing unit that generates a signal of a reverb component of the audio object on the basis of the reverb information and the audio object signal.

(2)

The signal processing device according to (1), in which the space reverb information is acquired at a lower frequency than the object reverb information.

(3)

The signal processing device according to (1) or (2), in which in a case where identification information indicating past reverb information is acquired by the acquisition unit, the reverb processing unit generates a signal of the reverb component on the basis of the reverb information indicated by the identification information and the audio object signal.

(4)

The signal processing device according to (3), in which the identification information is information indicating the object reverb information, and the reverb processing unit generates a signal of the reverb component on the basis of the object reverb information indicated by the identification information, the space reverb information, and the audio object signal.

(5)

The signal processing device according to any one of (1) to (4), in which the object reverb information is information depending on a position of the audio object.

(6)

The signal processing device according to any one of (1) to (5), in which the reverb processing unit generates a signal of the reverb component specific to the space on the basis of the space reverb information and the audio object signal, and generates a signal of the reverb component specific to the audio object on the basis of the object reverb information and the audio object signal.

(7)

A signal processing method including:

acquiring, by a signal processing device, reverb information including at least one of space reverb information specific to a space around an audio object or object reverb information specific to the audio object and an audio object signal of the audio object; and generating, by the signal processing device, a signal of a reverb component of the audio object on the basis of the reverb information and the audio object signal.

(8)

A program that causes a computer to execute processing including steps of:

acquiring reverb information including at least one of space reverb information specific to a space around an audio object or object reverb information specific to the audio object and an audio object signal of the audio object; and generating a signal of a reverb component of the audio object on the basis of the reverb information and the audio object signal.

REFERENCE SIGNS LIST

11 Signal processing device
21 Core decoding processing unit
22 Rendering processing unit
51-1, 51-2, 51 Amplification unit
52-1, 52-2, 52 Amplification unit
53-1, 53-2, 53 Object-specific reverb processing unit
54-1, 54-2, 54 Amplification unit
55 Space-specific reverb processing unit
56 Rendering unit
101 Encoding device
111 Object signal encoding unit
112 Audio object information encoding unit
113 Packing unit

The invention claimed is:

1. A signal processing device comprising:

processing circuitry configured to:

acquire reverb information including at least one of space reverb information specific to a space around an audio object or object reverb information specific to the audio object and an audio object signal of the audio object;

generate a signal of a reverb component of the audio object on a basis of the reverb information and the audio object signal; and perform rendering processing of the reverb component of the audio object and the audio object signal to generate an output audio signal.

2. The signal processing device according to claim 1, wherein in a case where identification information indicating past reverb information is acquired, the processing circuitry is configured to generate the signal of the reverb component on a basis of the reverb information indicated by the identification information and the audio object signal.

3. The signal processing device according to claim 2, wherein the identification information includes information indicating the object reverb information, and the processing circuitry is configured to generate the signal of the reverb component on a basis of the object reverb information indicated by the identification information, the space reverb information, and the audio object signal.

4. The signal processing device according to claim 1, wherein the object reverb information includes information depending on a position of the audio object.

5. The signal processing device according to claim 1, wherein the processing circuitry is configured to generate the signal of the reverb component specific to the space on a basis of the space reverb information and the audio object signal, and to generate the signal of the reverb component specific to the audio object on a basis of the object reverb information and the audio object signal.

6. The signal processing device according to claim 1, wherein the rendering processing includes rendering processing of the audio object signal and position information of the object reverb information to provide the output audio signal.

7. The signal processing device according to claim 1, wherein the rendering processing includes rendering processing of the audio object signal and position information of the space reverb information to provide the output audio signal.

8. The signal processing device according to claim 1, wherein the rendering processing includes rendering processing by VBAP (Vector Based Amplitude Panning).

9. A signal processing method executed by processing circuitry, the method comprising:

acquiring reverb information including at least one of space reverb information specific to a space around an audio object or object reverb information specific to the audio object and an audio object signal of the audio object;

generating a signal of a reverb component of the audio object on a basis of the reverb information and the audio object signal; and performing rendering processing of the reverb component of the audio object and the audio object signal to generate an output audio signal.

10. The signal processing method according to claim 9, wherein in a case where identification information indicating past reverb information is acquired, the signal of the reverb component is generated on a basis of the reverb information indicated by the identification information and the audio object signal.

11. The signal processing method according to claim 10, wherein the identification information includes information indicating the object reverb information, and the signal of the reverb component is generated on a basis of the object reverb information indicated by the identification information, the space reverb information, and the audio object signal.

12. The signal processing method according to claim 9, wherein the object reverb information includes information depending on a position of the audio object.

13. The signal processing method according to claim 9, wherein the signal of the reverb component is generated specific to the space on a basis of the space reverb information and the audio object signal, and the signal of the reverb component is generated specific to the audio object on a basis of the object reverb information and the audio object signal.

14. A non-transitory computer readable medium storing instructions that, when executed by a computer, cause the computer to execute processing comprising:

acquiring reverb information including at least one of space reverb information specific to a space around an audio object or object reverb information specific to the audio object and an audio object signal of the audio object;

generating a signal of a reverb component of the audio object on a basis of the reverb information and the audio object signal; and performing rendering processing of the reverb component of the audio object and the audio object signal to generate an output audio signal.

* * * * *